Patented June 29, 1948

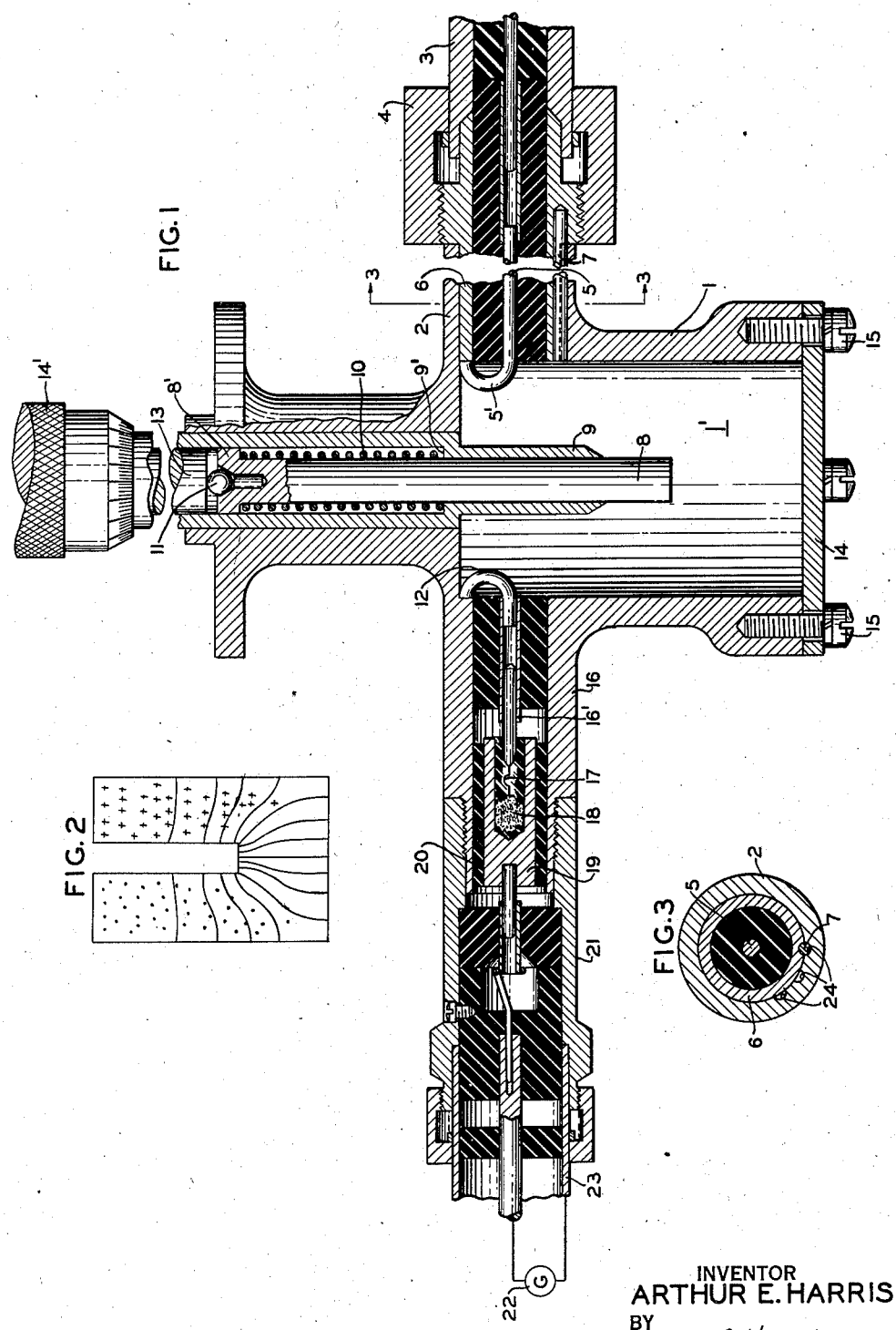

2,444,041

UNITED STATES PATENT OFFICE 2,444,041

WAVE METER

Arthur E. Harrison, Oceanside, N. Y., assignor to The Sperry Corporation, a corporation of Delaware Application February 25, 1942, Serial No. 432,178

8 Claims. (Cl. 250—39)

This invention relates, generally, to frequency indicators and the invention has reference more particularly to an improved ultra high frequency wave meter. The wave meter of this invention comprises an adjustable calibrated sharply tuned resonant circuit coupled to an input circuit whose frequency is to be determined and has an output circuit including a detector for use in determining the exact resonant point of the circuit.

One object of the invention is to provide a novel wave meter for ultra short waves that is of compact size and easily portable, the same being readily excited, the detector and tuned circuit units therefor being in a single case shielding the device from all external fields.

Another object of the invention is to provide a novel wave meter which will respond uniformly over a reasonable range of wavelengths as, for example, 8.5 to 11.5 cms., the Q of the tuned circuit being of the order of 1500 thereby affording rapid and accurate adjustment of the circuit, the low loss of the circuit enabling the same to be excited from sources of low power.

Still another object is to provide a novel wave meter having a preferred mode of oscillation with no other modes close to the preferred mode, whereby the tuned circuit has only one resonant point for each frequency, thereby facilitating the use of the device.

Another object of the invention is to provide a novel wave meter having a detector of the crystal type built integral therewith thereby eliminating the loss of high frequency power and increasing the overall efficiency of the device, the said device incorporating means for eliminating backlash in the manipulation thereof.

Other objects and advantages will become apparent from the specification, taken in connection with the accompanying drawing wherein the invention is embodied in concrete form.

In the drawing,

Fig. 1 is a fragmentary part cross-sectional view of the wave meter of this invention.

Fig. 2 is a schematic view illustrating the electromagnetic field within the resonator of the meter, and Fig. 3 is a cross-section taken along the line 3—3 of Fig. 1.

Similar characters of reference are used in all of the above figures to indicate corresponding parts.

Referring now to the drawing, the novel wave meter comprises a substantially cylindrical casing 1 having a terminal post structure 2 of the concentric line type to which is coupled the concentric supply line 3 by means of coupling 4. The terminal post 2 and the concentric line 3 are shown filled with dielectric and the inner conductor 5 of the terminal post is shown as having the form of a loop 5' projecting into the cylindrical chamber 1' provided within casing 1. The terminal post 2 is shown provided with an outer conductor element 6 in the form of a sleeve having a sliding and turning fit within the post 2. This sleeve carries a pin 7 which is selectively insertable into a plurality of angularly spaced slots 24 provided in the inner surface of the post 2. Thus, by partially withdrawing the sleeve 6 the pin 7 may be removed from one of the slots 24 and by turning the sleeve 6 angularly this pin 7 may be reinserted into another of the slots 24 thereby changing the angular position of the loop 5' within chamber 1' and hence correspondingly varying the coupling between loop 5' and the field within chamber 1'. Also, the degree of insertion of loop 5' into the chamber 1' may be varied by moving concentric line 3 and sleeve 6 inwardly or outwardly. Thus, it is possible to adjust the amount of power supplied to the chamber 1' so as to control the strength of oscillations therein and hence the energy supplied to the detector coupled to the output loop 12.

The resonant chamber 1' is of the concentric line type having an adjustable plunger 8 forming the inner conductor. This plunger and the inner walls of chamber 1' are preferably of highly conducting material, such as being silver-plated. The casing 1 is provided with an internal sleeve 9 which serves as a bearing sleeve for the plunger 8 and makes intimate contact therewith although allowing sliding movement of plunger 8 within this bearing sleeve. Sleeve 9 projects into chamber 1' for the major portion of the length of the plunger 8 so that in operation not only is an extensive low impedance contact arrangement provided between plunger 8 and sleeve 9 but a considerable portion of the oscillating current will not need to actually flow from sleeve 9 to plunger 8 since a field will be established between the member 9 and walls of the container as well as between the member 8 and such walls, as illustrated in Fig. 2.

A portion of the sleeve 9 extends externally of the cavity 1', which portion is enlarged to provide an annular recess around plunger 8 for receiving a compression spring 10 that bears at one end against a shoulder 9' of the sleeve 9 and at its other end against a head portion 8' of the plunger 8. This head portion is counter-sunk centrally to receive a thrust ball bearing 11 that engages the inner end of adjustable means such as a micrometer stem 13 which is actuated by the micrometer head 14'. Spring 10, acting against the head 8' of plunger 8 and through ball 11, serves to eliminate backlash between the plunger 8 and micrometer stem 13 thereby insuring accurate indications.

The end 14 of the chamber 1' opposite the free end of plunger 8 is shown removable as by use of screws 15. The output concentric line terminal post 16 is formed on casing 1 opposite terminal post 2. The inner conductor 16' of terminal post 16 is shown connected to a "cats-whisker" 17 of a crystal detector having a crystal 18 contained within a holder 19 of cylindrical shape. A thin layer of dielectric 20 as of Polystyrene is included between the holder 19 and the outer conductor of the terminal post so that the distributed capacity between holder 19 and such outer conductor serves as a by-pass condenser for the alternating component of the waves rectified by the crystal 18. This crystal detector may be of the type shown in copending application Serial No. 394,239, which has matured into a patent, Number 2,406,405 for Coaxial condenser crystal and method of making same, filed May 19, 1941 in the name of Frederick L. Salisbury.

The terminal post 16 is shown connected to an output concentric line 21 that like lines 16, 3 and 2, is shown filled with dielectric adapting the same for connection to the commercially available flexible dielectric filled concentric lines without the introduction of any reflections at joints. A meter 22 as of the micro-ammeter type is connected to be excited from the connected concentric line 23.

In use, energy whose frequency is to be measured is introduced through concentric line 3 supplying loop 5', the position of this loop determining the amount of energy supplied to the resonator chamber 1'. Standing electromagnetic waves are set up within chamber 1', the electric vector of said waves being largely confined between the free end portion of plunger 8 and sleeve 9 and the end wall 14 of chamber 1', the magnetic component of these waves being substantially of annular shape and surrounding the plunger 8 and sleeve 9, all as shown in Fig. 2.

The plunger 8 is adjusted until a condition of resonance is obtained as indicated by the reading of the meter 22. Owing to the low loss nature of the resonant circuit the same is adapted for use with weak sources of power. The resonant circuit used has no other modes of oscillation close to the preferred modes shown in Fig. 2, thereby enabling an extremely accurate indication of its natural frequency as indicated by the readings of micrometer 14' which may be directly calibrated in frequency or wavelength if desired.

Owing to the use of the detector circuit embodied directly in the concentric line terminal post 16 no ultra high frequency energy is lost through this circuit and the system is completely shielded from stray fields. Owing to the adjustability of loop 5' looseness of the coupling may be varied as desired which is highly important in a device of this character in order to protect the detector and meter 22 while greatly enlarging the power range of the sources whose frequencies are to be measured.

Owing to the use of the long sleeve 9 not only is good contact made between this sleeve and plunger 8 but considerable current does not even have to enter the plunger 8 thereby increasing the Q and efficiency of the device.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A wave meter comprising a closed hollow conducting casing providing a cylindrical interior resonator chamber, a plunger positioned concentrically within said chamber and axially adjustable therewithin, means for supplying energy whose frequency is to be measured to said chamber, concentric line means for removing energy from said chamber, and a detector incorporated within said concentric line means.

2. A wave meter comprising a hollow conducting casing providing a cylindrical interior chamber, a plunger positioned concentrically within said chamber and adjustable therewithin, micrometer indicating means for actuating said plunger, concentric line means comprising an adjustable loop for supplying energy whose frequency is to be measured to said chamber, additional concentric line means for removing energy therefrom, a detector incorporated within said additional concentric line means, a by-pass condenser incorporated in said additional concentric line means for the rectified output of said detector, and a current indicator fed from said additional concentric line means.

3. In a wave meter, the combination comprising a hollow conducting casing providing a cylindrical interior chamber, a plunger positioned concentrically within said chamber and adjustable therewithin, micrometer means for actuating said plunger, concentric line means comprising an adjustable loop for supplying to said chamber energy whose frequency is to be measured, additional concentric line means for removing energy from said chamber, and a detector incorporated within said additional concentric line means.

4. In a wave meter, the combination comprising a resonant chamber, means for admitting high frequency electromagnetic energy to said chamber for causing said chamber to resonate, a concentric line coupled to said chamber for conducting energy therefrom, and a detector incorporated within said concentric line for rectifying such conducted energy.

5. In a wave meter, a hollow conducting casing providing a chamber resonant to electromagnetic oscillations of predetermined frequency; a concentric line having inner and outer conductors for conducting high frequency electromagnetic energy between said chamber and the free end of said concentric line; and adjustable coupling means for electromagnetically coupling said chamber and said concentric line; said coupling means comprising a loop within said chamber and connecting said inner and outer conductors, and adjustable means for locating said loop in predetermined positions relative to the magnetic field of said electromagnetic oscillations in said chamber.

6. The combination as claimed in claim 5 wherein said adjustable means comprises an axially movable conection on said concentric line, said connection being adapted to hold said loop in a selected one of a plurality of predetermined angular positions about the axis of said concentric line and to provide adjustment of said loop axially of said concentric line relative to said chamber.

7. In a wave meter, a resonant chamber having an apertured wall, a tubular member disposed about said aperture externally of said wall, a coaxial conductor transmission line section telescopingly engaged with said member, a coupling loop interconnecting the adjacent ends of the conductors of said line, and cooperating means on said member and the outer conductor of said line for preselecting the angular disposition of said loop relative to the resonator field for predetermining the degree of coupling of said loop with said field.

8. In an ultra high frequency device, means defining a resonator chamber having an apertured wall, a section of coaxial conductor transmission line extending through said aperture, a loop interconnecting the adjacent inner ends of the outer and inner conductors of said line for coupling with the resonator field, means for preselecting the angular disposition of said loop relative to said chamber, means for axially adjusting said line section, and means in said device for holding said loop against angular movement during said axial adjustment.

ARTHUR E. HARRISON.

REFERENCES CITED

The following references are of record in the file of this patent:

UNITED STATES PATENTS

| Number | Name | Date |
|---|---|---|
| 1,305,202 | Donle | May 27, 1919 |
| 2,086,615 | Grundmann | July 13, 1937 |
| 2,106,713 | Bowen | Feb. 1, 1938 |
| 2,218,923 | Newhouse | Oct. 22, 1940 |
| 2,235,521 | Higgins | Mar. 18, 1941 |
| 2,245,138 | Zottn | June 10, 1941 |
| 2,304,186 | Litton | Dec. 8, 1942 |
| 2,349,440 | Lavoie | May 23, 1944 |